(12) United States Patent
Naik

(10) Patent No.: US 9,311,375 B1
(45) Date of Patent: Apr. 12, 2016

(54) SYSTEMS AND METHODS FOR COMPACTING A VIRTUAL MACHINE FILE

(75) Inventor: Dilip C. Naik, Redmond, WA (US)

(73) Assignee: Dell Software Inc., Aliso Viego, CA (US)

( * ) Notice: Subject to any disclaimer, the term of this patent is extended or adjusted under 35 U.S.C. 154(b) by 581 days.

(21) Appl. No.: 13/368,240

(22) Filed: Feb. 7, 2012

(51) Int. Cl.
G06F 7/00 (2006.01)
G06F 17/30 (2006.01)

(52) U.S. Cl.
CPC .... *G06F 17/30575* (2013.01); *G06F 17/30581* (2013.01)

(58) Field of Classification Search
CPC .................... G06F 17/30575; G06F 17/30581
USPC ......................................................... 707/637
See application file for complete search history.

(56) References Cited

U.S. PATENT DOCUMENTS

| | | | |
|---|---|---|---|
| 4,130,867 A | 12/1978 | Bachman et al. | |
| 4,648,031 A | 3/1987 | Jenner | |
| 4,665,520 A | 5/1987 | Strom et al. | |
| 4,916,608 A * | 4/1990 | Shultz ........................... | 718/104 |
| 5,222,235 A | 6/1993 | Hintz et al. | |
| 5,297,279 A | 3/1994 | Bannon et al. | |
| 5,325,505 A | 6/1994 | Hoffecker et al. | |
| 5,333,314 A | 7/1994 | Masai et al. | |
| 5,414,650 A | 5/1995 | Hekhuis | |
| 5,422,979 A | 6/1995 | Eichfeld et al. | |
| 5,423,037 A | 6/1995 | Hvasshovd | |
| 5,455,945 A | 10/1995 | VanderDrift | |
| 5,530,855 A | 6/1996 | Satoh et al. | |
| 5,551,020 A | 8/1996 | Flax et al. | |
| 5,553,303 A | 9/1996 | Hayashi et al. | |
| 5,596,504 A | 1/1997 | Tata et al. | |
| 5,596,747 A | 1/1997 | Katabami et al. | |
| 5,634,052 A | 5/1997 | Morris | |
| 5,640,561 A | 6/1997 | Satoh et al. | |
| 5,655,081 A | 8/1997 | Bonnell et al. | |
| 5,664,186 A | 9/1997 | Bennett | |
| 5,721,915 A | 2/1998 | Sockut et al. | |
| 5,758,356 A | 5/1998 | Hara et al. | |
| 5,761,667 A | 6/1998 | Koeppen | |
| 5,761,677 A | 6/1998 | Senator et al. | |
| 5,774,717 A | 6/1998 | Porcaro | |
| 5,778,377 A | 7/1998 | Marlin et al. | |

(Continued)

OTHER PUBLICATIONS

Armstrong, Ben, "How Do I Fix a Corrupted Virtual Hard Disk?", Virtual PC Guy's Blog, Jan. 7, 2009, in 4 pages.

(Continued)

*Primary Examiner* — Mark E Hershley
(74) *Attorney, Agent, or Firm* — Winstead PC

(57) ABSTRACT

Systems and methods for compacting a virtual machine file are presented. In one example, the system accesses a source virtual machine file associated with a guest file system. The system creates a destination virtual machine file based on the guest file system and initializes a block allocation table of the destination virtual machine file. The system accesses a block allocation table of the source virtual machine file and, for each block of the source virtual machine file, determines whether the block is in use. If so, the system copies the block to the destination virtual machine file and updates the block allocation table of the destination virtual machine file. If not, the system does not copy the block or update the block allocation table of the destination virtual machine file, thereby reducing the destination virtual machine file's size compared to the source virtual machine file's size.

30 Claims, 5 Drawing Sheets

(56) References Cited

U.S. PATENT DOCUMENTS

| | | |
|---|---|---|
| 5,778,392 A | 7/1998 | Stockman et al. |
| 5,796,934 A | 8/1998 | Bhanot et al. |
| 5,799,322 A | 8/1998 | Mosher, Jr. |
| 5,822,780 A | 10/1998 | Schutzman |
| 5,848,416 A | 12/1998 | Tikkanen |
| 5,893,924 A | 4/1999 | Vakkalagadda |
| 5,933,818 A | 8/1999 | Kasravi et al. |
| 5,933,820 A | 8/1999 | Beier et al. |
| 5,940,832 A | 8/1999 | Hamada et al. |
| 5,943,677 A | 8/1999 | Hicks |
| 5,948,108 A | 9/1999 | Lu et al. |
| 5,951,694 A | 9/1999 | Choquier et al. |
| 5,951,695 A | 9/1999 | Kolovson |
| 5,956,489 A | 9/1999 | San Andres et al. |
| 5,956,504 A | 9/1999 | Jagadish et al. |
| 5,978,594 A | 11/1999 | Bonnell et al. |
| 5,983,239 A | 11/1999 | Cannon |
| 5,990,810 A | 11/1999 | Williams |
| 5,991,761 A | 11/1999 | Mahoney et al. |
| 5,995,958 A | 11/1999 | Xu |
| 6,003,022 A | 12/1999 | Eberhard et al. |
| 6,016,497 A | 1/2000 | Suver |
| 6,026,412 A | 2/2000 | Sockut et al. |
| 6,029,195 A | 2/2000 | Herz |
| 6,067,410 A | 5/2000 | Nachenberg |
| 6,067,545 A | 5/2000 | Wolff |
| 6,070,170 A | 5/2000 | Friske et al. |
| 6,119,128 A | 9/2000 | Courter et al. |
| 6,122,640 A | 9/2000 | Pereira |
| 6,151,607 A | 11/2000 | Lomet |
| 6,157,932 A | 12/2000 | Klein et al. |
| 6,185,699 B1 | 2/2001 | Haderle et al. |
| 6,243,715 B1 | 6/2001 | Bogantz et al. |
| 6,253,212 B1 | 6/2001 | Loaiza et al. |
| 6,289,357 B1 | 9/2001 | Parker |
| 6,314,421 B1 | 11/2001 | Sharnoff et al. |
| 6,343,296 B1 | 1/2002 | Lakhamraju et al. |
| 6,363,387 B1 | 3/2002 | Ponnekanti et al. |
| 6,411,964 B1 | 6/2002 | Iyer et al. |
| 6,460,048 B1 | 10/2002 | Teng et al. |
| 6,470,344 B1 | 10/2002 | Kothuri et al. |
| 6,477,535 B1 | 11/2002 | Mirzadeh |
| 6,499,039 B1 | 12/2002 | Venkatesh et al. |
| 6,519,613 B1 | 2/2003 | Friske et al. |
| 6,523,035 B1 | 2/2003 | Fleming et al. |
| 6,584,474 B1 | 6/2003 | Pereira |
| 6,606,626 B1 | 8/2003 | Ponnekanti |
| 6,631,478 B1 | 10/2003 | Wang et al. |
| 6,671,721 B1 | 12/2003 | Branson et al. |
| 6,681,386 B1 | 1/2004 | Amin et al. |
| 6,691,139 B2 | 2/2004 | Ganesh et al. |
| 6,721,742 B1 | 4/2004 | Uceda-Sosa et al. |
| 6,728,780 B1 | 4/2004 | Hebert |
| 6,834,290 B1 | 12/2004 | Pugh et al. |
| 6,859,889 B2 | 2/2005 | Matsuura et al. |
| 6,907,512 B2 | 6/2005 | Hill et al. |
| 6,950,834 B2 | 9/2005 | Huras et al. |
| 6,959,441 B2 | 10/2005 | Moore |
| 7,065,538 B2 | 6/2006 | Aronoff et al. |
| 7,085,900 B2 | 8/2006 | Inagaki et al. |
| 7,093,086 B1 | 8/2006 | van Rietschote |
| 7,340,486 B1 | 3/2008 | Chapman |
| 7,370,164 B1 | 5/2008 | Nagarkar et al. |
| 7,447,854 B1 | 11/2008 | Cannon |
| 7,461,103 B2 | 12/2008 | Aronoff et al. |
| 7,546,325 B2 | 6/2009 | Kamei et al. |
| 7,610,331 B1 | 10/2009 | Genske et al. |
| 7,657,581 B2 | 2/2010 | Orenstein et al. |
| 7,669,020 B1 | 2/2010 | Shah et al. |
| 7,707,185 B1 | 4/2010 | Czezatke et al. |
| 7,752,487 B1 | 7/2010 | Feeser et al. |
| 7,765,400 B2 | 7/2010 | Costea et al. |
| 7,769,722 B1 | 8/2010 | Bergant et al. |
| 7,805,423 B1 | 9/2010 | Romine et al. |
| 7,844,577 B2 | 11/2010 | Becker et al. |
| 7,849,267 B2 | 12/2010 | Lam et al. |
| 7,895,161 B2 | 2/2011 | Sugimoto et al. |
| 7,925,850 B1 | 4/2011 | Waldspurger et al. |
| 8,001,596 B2 | 8/2011 | Wollnik et al. |
| 8,010,495 B1 | 8/2011 | Kuznetzov et al. |
| 8,046,550 B2 | 10/2011 | Feathergill |
| 8,060,476 B1 | 11/2011 | Afonso et al. |
| 8,135,930 B1 | 3/2012 | Mattox et al. |
| 8,166,265 B1 | 4/2012 | Feathergill |
| 8,250,033 B1 * | 8/2012 | De Souter et al. ............ 707/637 |
| 8,286,019 B2 | 10/2012 | Murase |
| 8,335,902 B1 | 12/2012 | Feathergill |
| 8,412,848 B2 * | 4/2013 | Therrien et al. ............. 709/247 |
| 8,464,214 B2 | 6/2013 | Miloushev et al. |
| 8,627,198 B2 | 1/2014 | Martinsen et al. |
| 2003/0145074 A1 | 7/2003 | Penick |
| 2004/0024961 A1 | 2/2004 | Cochran et al. |
| 2004/0030822 A1 | 2/2004 | Rajan et al. |
| 2004/0236803 A1 | 11/2004 | Spiegeleer |
| 2005/0114614 A1 | 5/2005 | Anderson et al. |
| 2005/0278280 A1 | 12/2005 | Semerdzhiev et al. |
| 2006/0005189 A1 | 1/2006 | Vega et al. |
| 2006/0020932 A1 | 1/2006 | Bentz et al. |
| 2006/0143501 A1 | 6/2006 | Tormasov et al. |
| 2006/0155735 A1 | 7/2006 | Traut et al. |
| 2006/0218544 A1 | 9/2006 | Chakraborty et al. |
| 2007/0208918 A1 | 9/2007 | Harbin et al. |
| 2007/0234334 A1 | 10/2007 | Araujo, Jr. et al. |
| 2007/0244938 A1 | 10/2007 | Michael et al. |
| 2008/0082593 A1 | 4/2008 | Komarov et al. |
| 2008/0155208 A1 | 6/2008 | Hiltgen et al. |
| 2008/0177994 A1 | 7/2008 | Mayer |
| 2008/0201414 A1 | 8/2008 | Amir Husain et al. |
| 2008/0244028 A1 | 10/2008 | Le et al. |
| 2008/0244577 A1 | 10/2008 | Le et al. |
| 2008/0250406 A1 | 10/2008 | Carpenter et al. |
| 2009/0007100 A1 | 1/2009 | Field et al. |
| 2009/0089781 A1 | 4/2009 | Shingai et al. |
| 2009/0158432 A1 | 6/2009 | Zheng et al. |
| 2009/0216816 A1 | 8/2009 | Basler et al. |
| 2009/0216970 A1 | 8/2009 | Basler et al. |
| 2009/0240904 A1 * | 9/2009 | Austruy et al. ............... 711/162 |
| 2009/0265403 A1 | 10/2009 | Fukumoto |
| 2009/0300023 A1 | 12/2009 | Vaghani |
| 2010/0030983 A1 | 2/2010 | Gupta et al. |
| 2010/0049930 A1 | 2/2010 | Pershin et al. |
| 2010/0058013 A1 | 3/2010 | Gelson et al. |
| 2010/0070725 A1 * | 3/2010 | Prahlad et al. ................ 711/162 |
| 2010/0076934 A1 | 3/2010 | Pershin et al. |
| 2010/0077165 A1 | 3/2010 | Lu et al. |
| 2010/0088277 A1 | 4/2010 | Rao et al. |
| 2010/0115332 A1 | 5/2010 | Zheng et al. |
| 2010/0122248 A1 | 5/2010 | Robinson et al. |
| 2010/0185587 A1 | 7/2010 | Lovinger |
| 2010/0228913 A1 * | 9/2010 | Czezatke et al. ............. 711/112 |
| 2010/0235813 A1 | 9/2010 | Manczak et al. |
| 2010/0235815 A1 | 9/2010 | Dittmer |
| 2010/0235832 A1 * | 9/2010 | Rajagopal et al. ................. 718/1 |
| 2010/0257331 A1 | 10/2010 | Frank |
| 2010/0262585 A1 | 10/2010 | Rosikiewicz et al. |
| 2010/0262586 A1 | 10/2010 | Rosikiewicz et al. |
| 2010/0262802 A1 | 10/2010 | Goebel et al. |
| 2010/0293140 A1 * | 11/2010 | Nishiyama .................... 707/636 |
| 2010/0306412 A1 * | 12/2010 | Therrien et al. ............. 709/247 |
| 2011/0035358 A1 * | 2/2011 | Naik ........................... 707/640 |
| 2011/0047340 A1 | 2/2011 | Olson et al. |
| 2011/0145199 A1 | 6/2011 | Prasad Palagummi |
| 2011/0153697 A1 | 6/2011 | Nickolov et al. |
| 2011/0154325 A1 | 6/2011 | Terasaki |
| 2011/0161294 A1 * | 6/2011 | Vengerov et al. ............. 707/637 |
| 2011/0225122 A1 * | 9/2011 | Denuit et al. ................ 707/634 |
| 2012/0084598 A1 * | 4/2012 | Alibakhsh et al. ........... 714/4.11 |
| 2012/0109897 A1 | 5/2012 | Janakiraman et al. ........ 707/660 |
| 2012/0210417 A1 * | 8/2012 | Shieh .............................. 726/12 |
| 2012/0272240 A1 * | 10/2012 | Starks et al. ..................... 718/1 |
| 2012/0297246 A1 | 11/2012 | Liu et al. |
| 2013/0007506 A1 * | 1/2013 | Jain et al. ..................... 714/4.12 |
| 2013/0014102 A1 * | 1/2013 | Shah ................................ 718/1 |
| 2013/0097599 A1 * | 4/2013 | Konik et al. ..................... 718/1 |

(56) References Cited

U.S. PATENT DOCUMENTS

| | | | |
|---|---|---|---|
| 2013/0151802 A1* | 6/2013 | Bahadure et al. | 711/162 |
| 2013/0185716 A1* | 7/2013 | Yin et al. | 718/1 |
| 2013/0246685 A1* | 9/2013 | Bhargava et al. | 711/6 |

OTHER PUBLICATIONS

Microsoft Corporation Technet, "Compacting Dynamically Expanding Virtual Hard Disks", retrieved Feb. 6, 2012, in 2 pages.
Microsoft Corporation Technet, "To Compact a Dynamically Expanding Virtual Hard Disk", retrieved Feb. 6, 2012, in 1 page.
Microsoft Corporation, "Microsoft Windows XP—Compact", Command-line reference A-Z, retrieved Feb. 6, 2012, in 2 pages.
Naik, Dilip, "Virtual Machine Storage—often overlooked optimizations", 2010 Storage Developer Conference, Storage Networking Industry Association, Sep. 2010, in 21 pages.
Russinovich, Mark, "SDelete v1.6", Windows Sysinternals, published Sep. 1, 2011, in 3 pages.
U.S. Appl. No. 12/566,231, filed Sep. 24, 2009, Feathergill et al.
U.S. Appl. No. 12/762,162, filed Apr. 16, 2010, Mattox, Jason.
U.S. Appl. No. 13/156,199, filed Jun. 8, 2011, Feathergill et al.
U.S. Appl. No. 13/218,362, filed Aug. 25, 2011, Feathergill et al.
U.S. Appl. No. 13/244,187, filed Sep. 23, 2011, Afonso et al.
U.S. Appl. No. 13/368,240, filed Feb. 7, 2012, Naik.
"Data Deduplication Deep Dive, How to Put Data Storage on a Diet", InfoWorld, Mar. 2010, in 5 pages.
"The What, How and Where of Deduplication", Spectra nTier with FalconStor Deduplication, Spectra Logic Corporation, May 2008, in 12 pages.
"Quest SharePlex for Oracle," Brochure, Quest Software, Inc., Nov. 1999, 4 pages.
Space Management and Reorganization: Challenges and Solutions, http://quest.com/whitepapers/space_manager_wp.doc, published on or around Dec. 21, 1999.
"Top Five Tips for Space Management and Reorganization," believed to be published after Jul. 21, 1998, in 2 pages.
Backup Critic, "File Versus Image Backups," retrieved from http://www.backupcritic.com/software-buyer/file-verus-image.html on May 4, 2010, in 3 pages.
Computer Associates, "Platinum OnlineReorg Technical Overview, OnlineReorg", http://platinum.com/products/custstor/tsreorg.htm, 5 pages downloaded on Nov. 30, 1999.
Computer Associates, "Platinum Tsreorg Automates Tablespace Reorganizations, Customer Story", http://platinum.com/products/custstor/tsreorg.htm, 2 pages downloaded on Nov. 30, 1999.
Computer Associates, "ProVision Tsreorg for Oracle, Brochure, Database Utilities Tsreorg for Oracle", http://platinum.com/products/custstor/tsreorg.htm, 4 pages downloaded on Nov. 30, 1999.
Computer Associates, "Rapid Reorg for DB2 for OS/390, Brochure", http://platinum.com/products/custstor/tsreorg.htm, 3 pages downloaded on Nov. 30, 1999.
Data Sheet: Data Protection, "Symantec NetBackup 7, The Symantec NetBackup Platform: Complete protection for your information-driven enterprise," Symantec Corporation, Dec. 2009, in 8 pages.
EMC Deduplication Frequently Asked Questions, http://www.datadomain.com/resources/faq.html, downloaded Jun. 7, 2011, 4 pages.
Harley Stagner, "Aligning disk partitions to boost virtual machine performance", Vmware Management, Migration and Performance, http://searchvmware.techtarget.com/tip/0,289483,sid179_gci1344730_mem1,00.html, Jan. 28, 2009, pp. 1-5.
Jeff Graves, "Partition Alignment", ORCS Web Team Blog, http://www.orcsweb.com/blog, Sep. 14, 2009, pp. 1-2.
Jin, Keren et al.,"The Effectiveness of Deduplication on Virtual Machine Disk Images", SYSTOR 2009, May 2009, in 12 pages.
John Willemse, "VMware disk alignment VMDK settings and align at the 64k boundary blogSphere bug desktop enterprise microsoft server vist . . . ", Planet Lotus, http://planetlotus.org/profiles/john-willemse_49586, Apr. 30, 2009, pp. 1-5 (of 44).
Joseph Pagano, paper on Microsoft Exchange Disaster Recovery Planning, document version 3.00, 1996, in 39 pages.
K. Loney, et al., "Oracle8i, DB Handbook," Oracle Press, 2000, p. 20.
Kleo Bare Metal Backup, Wikipedia, retrieved from http://en.wikipedia.org/wiki/Kleo_Bare_Metal_Backup on Apr. 14, 2010, in 3 pages.
L. Leverenz, et al., "Oracle8i Concepts," Oracle Corp., vol. 2, Release 8.1.5, 1999, p. 20-3.
Laverick, Mike, "VMware ESX 3.x Server and VirtualCenter 2.x (GA Build Eval) Service Console Guide," Document Ver. 1.2, RTFM Education, downloaded Dec. 17, 2008, in 73 pages.
Massiglia, Paul, "Block-Level Incremental Backup", Veritas Software Corporation, Feb. 2000, in 13 pages.
Microsoft TechNet, Windows Server 2003, retrieved from http://technet.microsoft.com/en-us/library/cc706993(WS.10,printer).aspx on Aug. 3, 2011, in 6 pages.
MSDN, Overview of Processing a Backup Under VSS, retrieved from http://msdn.microsoft.com/en-us/library/aa384589(d=printer,v=VS.85).aspx on Aug. 3, 2011, in 5 pages.
Oracle: Introduction to PL/SQL, Power Point Presentation Regarding Triggers, slides 4, 6-7, 11, 14-17, 28, and 51, http://training.ntsource.com/dpec/COURSES/PL1/plc011.htm, 10 pages downloaded on Oct. 20, 2000.
Tom Hirt, "Importance of Disk Alignment in VMware", VMware Disk Alignment—How-to Align VMware Partitions—Disk, Alignment, Vmfs, Vmdk, Esx, Apr. 9, 2009, pp. 1-15.
Veeam Technology Overview, "The New Standard for Data Protection," Veeam Software, Apr. 2010, in 2 pages.
Veritas NetBackup for VMware Adminstrator's Guide, UNIX, Windows, and Linux, Release 6.5.4, Symantec Corporation, 2009, in 66 pages.
VMware, "Recommendations for Aligning VMFS Partitions", VMware Infrastructure 3, VMware Performance Study, Feb. 2009, pp. 1-10.
VMware, Inc., "VMware Virtual Machine File System: Technical Overview and Best Practices", A VMware Technical White Paper, http://www.vmware.com/support/, 2007, Issue Version 1.0, pp. 1-19.
U.S. Appl. No. 13/850,164, filed Mar. 25, 2013, Feathergill.
U.S. Appl. No. 12/762,162, filed Apr. 16, 2010, titled "Block Status Mapping System for Reducing Virtual Machine Backup Storage", in 29 pages.
U.S. Appl. No. 13/218,362, filed Aug. 25, 2011, titled "Multitier Deduplication Systems and Methods", 50 pages.
Afonso, Delano Xavier, U.S. Appl. No. 13/764,011, filed Feb. 11, 2013.
U.S. Appl. No. 13/244,167, filed Sep. 23, 2011, Feathergill, Systems and Methods for Performing Backup Operations of Virtual Machine Files.
U.S. Appl. No. 13/244,187, filed Sep. 23, 2011, Afonso et al., Backup Systems and Methods for a Virtual Computing Environment.
U.S. Appl. No. 12/566,231, filed Sep. 24, 2009, Feathergill et al., Systems and Methods for Data Management in a Virtual Computing Environment.
U.S. Appl. No. 12/502,035, filed Jul. 13, 2009, Mattox et al., Replication Systems and Methods for a Virtual Computing Environment.
U.S. Appl. No. 12/762,162, filed Apr. 16, 2010, Mattox, Block Status Mapping System for Reducing Virtual Machine Backup Storage.
U.S. Appl. No. 13/156,199, filed Jun. 8, 2011, Feathergill et al., Cataloging System for Image-Based Backup.
U.S. Appl. No. 13/218,362, filed Aug. 25, 2011, Feathergill et al., Multitier Deduplication Systems and Methods.
U.S. Appl. No. 12/537,831, filed Aug. 7, 2009, Naik, Optimized Copy of Virtual Machine Storage Files.

* cited by examiner

SYSTEMS AND METHODS FOR COMPACTING A VIRTUAL MACHINE FILE

TECHNICAL FIELD

The present disclosure relates to virtual machines. More specifically, the present disclosure relates to systems and methods for compacting a virtual machine file.

BACKGROUND

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. For example, a virtualization layer, or hypervisor, can allocate the computing resources of one or more host servers into one or more virtual machines and can further provide for isolation between such virtual machines. In such a manner, the virtual machine can be a representation of a physical machine by software.

In many virtual machine implementations, each virtual machine is associated with at least one virtual machine disk, hard disk, or image located in one or more files in a data store. These virtual machine disks or images are commonly referred to as virtual machine storage files or virtual machine files. The virtual machine image can include files associated with a file system of a guest operating system.

SUMMARY

This disclosure describes examples of systems and methods for compacting a virtual machine file. In one embodiment, a method for compacting a virtual machine file may be performed by a physical computer system. Typically, the method may be performed with a dynamic virtual machine file. However, in some implementations, the method may be performed with a static virtual machine file. A system performing the method may access a source virtual machine file associated with a guest file system. The system can create a destination virtual machine file based on the guest file system. Typically, the destination virtual machine is a dynamic virtual machine. However, in some implementations, the destination virtual machine file may be a static virtual machine file regardless of whether the source virtual machine is a dynamic or static virtual machine file. Alternatively, the destination virtual machine file can be the same type of virtual machine file as the source virtual machine file. After creating the destination virtual machine file, the system initializes a block allocation table of the destination virtual machine file. The system can access a block allocation table of the source virtual machine file. For each block of the source virtual machine file identified in the block allocation table of the source virtual machine file, the system can determine whether the block is in use. In response to determining that the block is in use, the system can copy the block to the destination virtual machine file and update the block allocation table of the destination virtual machine file. In response to determining that the block is not in use, the system does not copy the block and does not update the block allocation table of the destination virtual machine file thereby reducing a size of the destination virtual machine file compared to a size of the source virtual machine file.

In certain embodiments, the system may determine the guest file system associated with the source virtual machine file. The system may copy a file header of the source virtual machine to the destination virtual machine. Further, in certain implementations, the system copies a file footer of the source virtual machine to the destination virtual machine.

To determine whether the block is in use, the system, in some embodiments, accesses a logical cluster number bitmap inside the guest file system of the source virtual machine file. The system identifies one or more clusters associated with the block. The system may use the logical cluster number bitmap to determine whether at least one of the one or more clusters is in use.

In some embodiments, the system may copy metadata associated with the source virtual machine file to the destination virtual machine file. Further, in some embodiments, the system may update the metadata associated with the destination virtual machine file based on the blocks copied from the source virtual machine file to the destination virtual machine file.

In certain embodiments, the system determines the size of the source virtual machine file prior to creating the destination virtual machine file. In response to determining that the size of the source virtual machine file satisfies a threshold, the system may create the destination virtual machine file. In some embodiments, determining that the size of the source virtual machine file satisfies the threshold further comprises the system determining whether the size of the source virtual machine exceeds a threshold size.

In some embodiments, the system determines a percentage of blocks not in use prior to creating the destination virtual machine file. In response to determining that the percentage of blocks not in use satisfies a threshold, the system may create the destination virtual machine file. For certain embodiments, determining that the percentage of blocks not in use satisfies the threshold further comprises the system determining that the percentage of blocks not in use exceeds a threshold percentage.

In some implementations, the initial size of the destination virtual machine file is less than the size of the source virtual machine file.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Introduction

Figure 1:
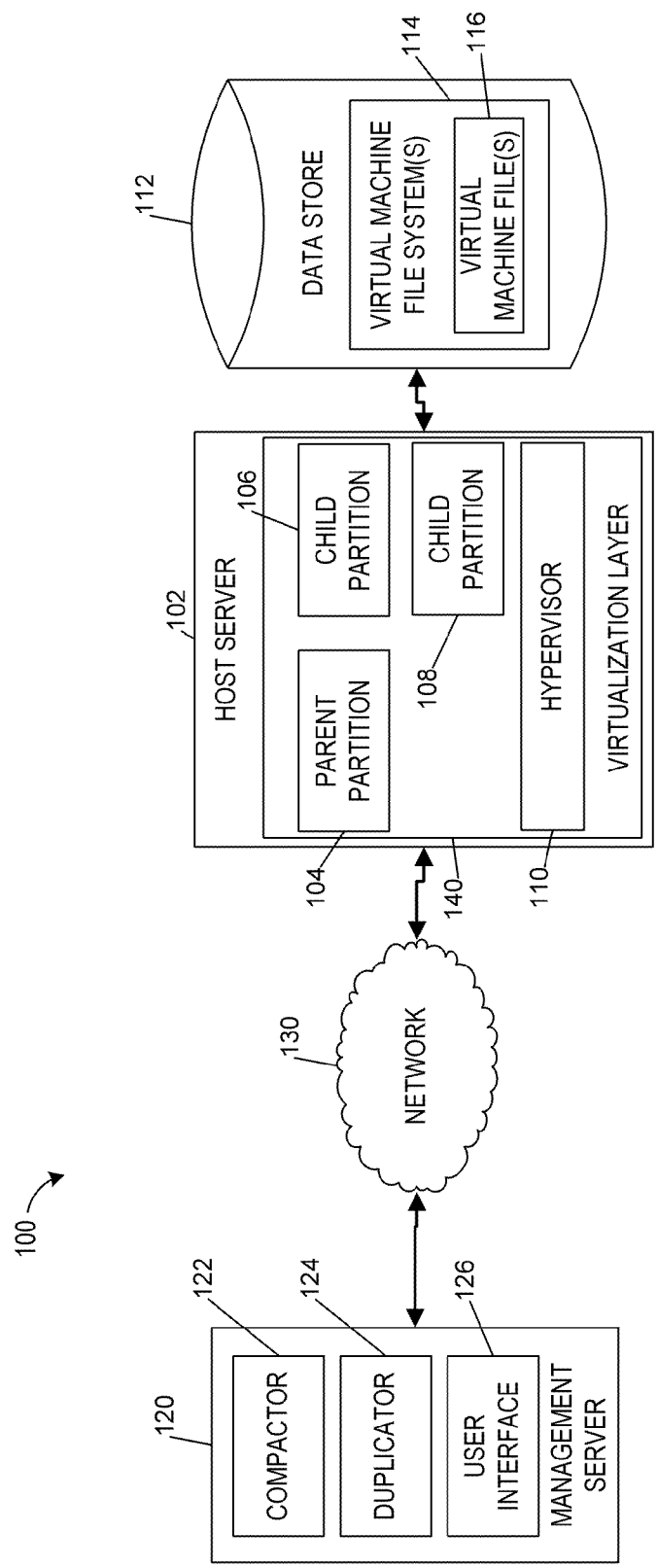
FIG. 1 illustrates an embodiment of a virtual computing environment.

Computer systems access an increasing amount of data, whether that data is associated with media such as music, or video, or whether that data is associated with virtual machines. Computer systems traditionally access this vast amount of data using organized units referred to as volumes. A volume can be a logical entity that may include other logical entities, e.g., files and directories. Traditionally, volumes were created on physical media such as hard disks.

Recent developments in virtualization have led to a logical volume being stored inside a file on a physical storage disk. For example, a virtual disk image can be a file on a physical disk, which has a well-defined, published or proprietary, format and can be interpreted by a virtualization system as a hard disk. Examples of such developments include Microsoft® Windows® storing iSCSI (Internet Small Computer System Interface) volumes inside a Virtual Hard Disk (VHD) file, and Windows® 7 storing a volume inside a VHD file and being able to boot from the VHD file. Another example of a logical volume being stored in a file is a volume stored in the VMware® "VMDK" file format.

The VHD file format is associated with Microsoft® Hyper-V and Citrix® Xen virtualization. Both Microsoft and Citrix virtualization products use a VHD file format. Also, some backup applications backup data into VHD volumes. The Microsoft Windows Storage Server product presents block storage devices accessible via the iSCSI protocol and these block storage devices are "backed" by VHD file based volumes.

Virtual machine files can be large and it is not uncommon for a virtual machine file to exceed 10s or 100s of gigabytes (GB) in size. With a static or fixed size virtual machine file, the virtual machine file is created with its entire memory size allocated. For example, if a user (e.g., an administrator) configures a virtual machine file with a 100 GB capacity, the entire 100 GB will be allocated when the virtual machine file is created. Due to overhead, it is possible for the virtual machine file to be a little smaller or a little larger than 100 GB; however; the total size of the virtual machine file generally remains at substantially 100 GB during the lifetime of the virtual machine file.

Unfortunately, it can be difficult to determine the amount of space needed for a virtual machine file before the file is used by user. Thus, when first creating a particular virtual machine file, some users (e.g., administrators) may allocate much more space for the virtual machine file than, in hindsight, is necessary for the virtual machine file based on its use after creation. One solution to this problem is to use a dynamic virtual machine file or a dynamically expanding virtual machine file. With a dynamic virtual machine file, the virtual machine file can be created or initialized with a subset of its total capacity initially allocated. Then, as more space is required by the virtual machine, the virtual machine file may be allocated additional space up to its total capacity. Thus, in some such cases, space may not be allocated to the virtual machine file unless and until the space is actually required by the virtual machine file. For example, a user (or administrator) can request or configure a virtual machine file with a total capacity of 100 GB, however, the virtual machine file may initially be created with a smaller initial size (e.g., 50 megabytes). If a user writes several media files to the virtual machine file of the virtual machine causing the virtual machine file to require more than the initial allocated space, the dynamically expanding virtual machine file may be allocated additional space up to the 100 GB total capacity initially configured by the user (or administrator) as the maximum capacity for the virtual machine file. In some cases, an administrator may select the initial capacity or size of the virtual machine file. However, in some cases, the initial size is a characteristic of the virtual machine file that may be preconfigured or may be determined based on the system creating the virtual machine file.

Generally, dynamically expanding virtual machine files are not dynamically shrinking. Therefore, continuing the previous example, if the user deletes the previously added media files, the virtual machine file remains the same size as the virtual machine file before the media files were deleted. In effect, the space originally allocated to the deleted media files remains allocated to the virtual machine file (even though no longer used); therefore, this space cannot be allocated to other users of the system. Thus, like static virtual machine files, it is often the case that dynamic virtual machine files will waste storage space. Sometimes, the dynamic virtual machine files will waste as much space as a static virtual machine file with an underutilized storage space allocation.

In some cases, in an attempt to reclaim unused space, an administrator, or other authorized user, will use a marking utility or a zero-filling utility inside the virtual machine file to mark or fill with zeros unused space within the virtual machine file. A compacting tool can be used to create a copy of the virtual machine file without any of the zero-filled space resulting in a smaller version of the virtual machine file. Although this compaction reduces the size of the virtual machine file, it suffers from some drawbacks. For example, with a dynamically expanding virtual machine file, using a zero-filling utility can cause the dynamically expanding virtual machine file to grow to its maximum capacity. Thus, although a specific dynamically expanding virtual machine file may rarely if ever grow, at least temporarily, to its maximum capacity when used for its created purpose, it may still be necessary to reserve enough space for the virtual machine file's maximum capacity to allow for the zero-filling based method of compaction.

Further, each time a compaction operation is performed using the zero-filling approach, a number of write operations are performed to zero-fill the virtual machine file. Typically, hard disks, and other storage devices (e.g., flash memory), are designed to handle a specific number of write operations per logical or physical storage unit (e.g., bit, byte, sector, track, etc.). After the number of write operations is exceeded, there is an increased probability of disk failures and other hard disk, or storage device, related errors occurring. Thus, zero-filling based compaction of a virtual machine file may reduce the lifespan of the storage device that stores the virtual machine file. In addition, it is often the case that the number of virtual machines that can be hosted by a physical server is bound by the disk Input/Output (I/O) capacity of the storage device associated with the physical server, as opposed to, or in addition to, the Central Processing Unit (CPU) capacity of the physical server. Zero-filling a virtual machine file may use a large percentage of the available disk I/O capacity thereby reducing the performance of other virtual machines hosted by the physical server, or virtualization host.

The present disclosure describes embodiments of a system and a method for compacting a virtual machine file without some or all of the aforementioned problems or drawbacks. In some embodiments of the present disclosure, the system can access a virtual machine file and copy one or more blocks that include undeleted data to a new or destination virtual machine file while ignoring blocks, for example, that include no data, zero-filled data, data marked for deletion, or data that is otherwise not in use by the file system of the virtual machine file. In some implementations, the system can determine whether a block is in use by accessing metadata associated with the virtual machine file. Advantageously, embodiments of the system can identify unused blocks or blocks with deleted data without zero-filling the virtual machine file thereby reducing the number of write operations used to compact the virtual machine file compared to the aforementioned zero-filling compaction process.

In certain embodiments, the system compacts a source dynamic virtual machine file by copying the data blocks that are in use by the source dynamic machine file to a destination dynamic virtual machine file and then deletes the source dynamic virtual machine file. Alternatively, the system may copy the data blocks that are in use by the source dynamic machine file to a static virtual machine file. As another embodiment, the system may copy the data blocks from a static virtual machine file to a dynamic virtual machine file or a destination static virtual machine file. All possible combinations of compaction for dynamic and static virtual machine files are contemplated. For instance, it is possible for a static virtual machine file to be copied to a dynamic virtual machine file, for the dynamic virtual machine file to be compacted, and then for the compacted dynamic virtual machine file to be copied to another static virtual machine file, which may be allocated less storage space than the initial static virtual machine file.

Advantageously, certain embodiments of the system can analyze a virtual machine file over a period of time to determine the average or maximum amount of space used by the virtual machine file. The system can then compact the virtual machine file to a smaller static virtual machine file or to a dynamic virtual machine file based on the average and/or maximum space used by the virtual machine file. For example, if the system determines that a source static virtual machine file over a period of two years used less than 50% of the total space allocated to it, the system may compact the virtual machine file to a destination static virtual machine file with a smaller capacity (e.g., 50% or 75% of the total capacity of the source virtual machine file). Alternatively, the system may compact the virtual machine file to a dynamic virtual machine file having a reduced total capacity (e.g., 50% or 75% of the total capacity of the source dynamic virtual machine file).

In certain embodiments, the system compacts the virtual machine file in response to a command from a user or administrator. Alternatively, the system may compact the virtual machine file in response to the amount or percentage of unused space or deleted blocks in the virtual machine file exceeding a threshold. In some implementations, the system compacts the virtual machine file in response to the threshold being exceeded for a period of time. For example, the system may compact a virtual machine file that exceeds 50% free space for a period of one week.

Although this disclosure generally describes various embodiments of compacting and copying a source virtual machine file to a destination virtual machine file, in some embodiments, the source virtual machine file can be a first virtual machine file and the destination virtual machine file can be a second virtual machine file.

Example of a Virtual Computing Environment

FIG. 1 illustrates an embodiment of a virtual computing environment 100 in accordance with the present disclosure. In general, the virtual computing environment 100 can include any number of computing systems for executing virtual machine files. Further, in certain embodiments, the virtual machine environment 100 includes one or more systems and/or services for compacting a virtual machine file.

As shown in FIG. 1, the virtual computing environment 100 can include a host server 102 in communication with a data store 112. Although only one host server 102 and data store 112 is depicted, it is possible for the virtual computing environment to include more than one host server 102 and/or data store 112. In certain embodiments, the host server 102 can be implemented with one or more physical computing devices. Further, the data store 112 may be implemented using one or more physical data storage devices.

In certain embodiments, the host server 102 is configured to host one or more virtual machines (not shown) executing on top of a virtualization layer 140. The virtualization layer 140 may include one or more partitions (e.g., the parent partition 104, the child partition 106, or the child partition 108) that are configured to include the one or more virtual machines. Further, the virtualization layer 140 may include, for example, a hypervisor 110 that decouples the physical hardware of the host server 102 from the operating systems of the virtual machines. Such abstraction allows, for example, for multiple virtual machines with different operating systems and applications to run in isolation or substantially in isolation on the same physical machine. The hypervisor 110 can also be referred to as a virtual machine monitor (VMM) in some implementations.

The virtualization layer 140 can include a thin piece of software that runs directly on top of the hardware platform of the host server 102 and that virtualizes resources of the machine (e.g., a native or "bare-metal" hypervisor). In such embodiments, the virtual machines can run, with their respective operating systems, on the virtualization layer 140 without the need for a host operating system. Examples of such bare-metal hypervisors can include, but are not limited to, ESX SERVER by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), and the like.

In other embodiments, the host server 102 can include a hosted architecture in which the virtualization layer 140 runs within a host operating system environment. In such embodiments, the virtualization layer 140 can rely on the host operating system for device support and/or physical resource management. Examples of hosted virtualization layers can include, but are not limited to, VMWARE WORKSTATION and VMWARE SERVER by VMware, Inc., VIRTUAL SERVER by Microsoft Corporation, PARALLELS WORKSTATION by Parallels, Inc., Kernel-Based Virtual Machine (KVM) (open source), and the like.

Some or all of the virtual machines can include a guest operating system and associated applications. In such embodiments, a virtual machine accesses the resources (e.g., privileged resources) of the host server 102 through the virtualization layer 140. However, in some implementations, the virtual machines can access at least some of the resources of the host server 102 directly.

The host server 102 can communicate with the data store 112 to access data stored in one or more virtual machine files. For instance, the data store 112 can include one or more virtual machine file systems 114 that maintain virtual machine files 116, virtual disk files, or virtual machine images for some or all of the virtual machines on the host server 102. The virtual machine files 116 can include dynamic virtual machine files, static or fixed size virtual machine files, or a combination of the two. The virtual machine files 116 can store operating system files, program files, application files, and other data of the virtual machines. Example formats of virtual disk files can include VHD, VMDK, VDI, and so forth.

In certain embodiments, the virtual machine file system 114 includes a VMWARE VMFS cluster file system provided by VMware, Inc. In such embodiments, the VMFS cluster file system enables multiple host servers (e.g., with installations of ESX server) to have concurrent access to the same virtual machine storage and provides on-disk distributed locking to ensure that the same virtual machine is not powered on by multiple servers at the same time. Other platforms may have different file systems (such as, e.g., an NTFS, HFS, FAT, or EXT file system). In other embodiments, the virtual machine file system 114 is stored on the host server 102 instead of in a separate data store.

The data store 112 can include any physical or logical storage for holding virtual machine files 116. For instance, the data store 112 can be implemented as local storage for the host server 102, accessible using a serial advanced technology attachment (SATA) protocol, a small computer system interface (SCSI) protocol, or the like. The data store 112 can also be implemented as part of a storage area network (SAN) or network attached storage (NAS). Accordingly, the data store 112 can be accessed over a network using a protocol such as a fibre channel protocol (FCP), an Internet SCSI (iSCSI) protocol, a network file system (NFS) protocol, a common Internet file system (CIFS) protocol, a file transfer protocol (FTP), a secure FTP (SFTP) protocol, combinations of the same, or the like. The data store 112 can also include one or more redundant arrays of independent disks (RAID) or the like.

The virtual computing environment 100 further includes a network 130 for communication between the host server 102 and a management server 120. The network 130 can provide wired or wireless communication between the host server 102, the management server 120, and/or the data store 112. The network 130 can be a local area network (LAN), a wide area network (WAN), the Internet, an intranet, combinations of the same, or the like. In certain embodiments, the network 130 can be configured to support secure shell (SSH) tunneling or other secure protocol connections for the transfer of data between the host server 102 and/or the data store 112. In certain embodiments, some or all of the management server 120, the host server 102, and the data store 112 may communicate with each other without the network 130.

The management server 120 can be implemented as one or more computing devices. In the embodiment illustrated in FIG. 1, the management server 120 includes a compactor 122, a duplicator 124, and a user interface 126. Although depicted as a separate system, in some implementations, the host server 102 may include some or all of the management server 120. For example, the host server 102 may include the management server 120 in its entirety, or it may include, e.g., the compactor 122, but not the duplicator 124, or vice versa.

In certain embodiments, the management server 120 can use the compactor 122 to compact one or more virtual machine files 116. Generally, the compactor 122 is configured to compact dynamic virtual machine files. However, in some embodiments, the compactor 122 may be configured to compact a static or fixed size virtual machine file. In certain embodiments, by compacting the virtual machine files 116, the compactor 122 can reduce the size of the virtual machine files 116 on the data store 112, thereby advantageously freeing storage space for use by other users, applications, or virtual machines.

In some implementations, the compactor 122 may use the duplicator 124 to duplicate part or all of a virtual machine file 116 as part of the compaction process. Further, the duplicator 124 may be configured to duplicate a virtual machine file 116 independently of a compaction process. For example, the duplicator 124 may be used to create backup copies of a virtual machine file 116. In some embodiments, the duplicator 124 may use any of the methods or processes disclosed in U.S. Patent Publication No. 2011/0035358, titled "Optimized Copy of Virtual Machine Storage Files," which is hereby incorporated by reference herein in its entirety for all that it contains.

The user interface 126 can be configured to display to a user and/or receive from a user information relating to operation of the management server 120. In certain embodiments, the user interface 126 causes the display of one or more windows for obtaining user input and/or outputting status information with respect to the management server 120, the host server 102, and/or one or more of the virtual machine files 116. Using the user interface 126, a user can cause the compactor 122 to compact a virtual machine file 116.

Alternatively, or in addition, the user can set one or more thresholds associated with the number of blocks of the virtual machine file 116 that are not in use. In certain embodiments, the compactor 122 can compact the virtual machine file 116 in response to the management server 120 determining that the number of blocks not in use, and/or no longer in use, satisfies one or more of the thresholds. In some cases, some or all of the thresholds may be associated with the percentage of blocks of the virtual machine file 116 that are not in use. Further, for some implementations the thresholds may be associated with the number or percentage of blocks of the virtual machine file 116 that are in use. In various embodiments, satisfying a threshold can include meeting a threshold value, exceeding a threshold value, or not exceeding a threshold value. For example, the compactor 122 may compact a virtual machine file 116 when the number of free blocks is greater than or equal to the number of free blocks associated with the threshold. Further, the term "block" is used in its ordinary and customary sense and can represent an abstraction referring to a sequence of bits or bytes which may be read substantially in parallel. For example, each data block may be 32- or 64-bytes and each time a block is accessed, the 32- or 64-bytes may be accessed substantially in parallel.

In some embodiments, the threshold may be associated with the size of the virtual machine file. For example, if the size of the virtual machine file exceeds 5 GB, or 50% of the space allocated to the virtual machine file, or some other measure of virtual machine file size, the compactor 122 may perform a compaction process (e.g., the process described below with reference to FIG. 4). In some embodiments, if the compaction process does not result in the size of the virtual machine file being reduced below the threshold and/or by a goal amount (e.g., size or percentage), the compactor 122 may modify the threshold used for initiating the compaction process. Alternatively, or in addition, if the virtual machine file was compacted within a threshold time period, the compactor 122 may delay performing the compaction process again at least until the threshold time period has been exceeded. Advantageously, in certain embodiments, modifying the threshold based on the result of performing the compaction process reduces the probability of performing the compaction process more often than desired by a user or than is desirable for, for example, performance of the virtual machine file. Similarly, in some embodiments, delaying repeat performance of the compaction process within a threshold time period reduces the frequency of performing the compaction process to a rate selected by a user or to a rate that optimizes the availability of the virtual machine file versus the opportunity to reclaim wasted storage space.

Example Host Server

Figure 2:
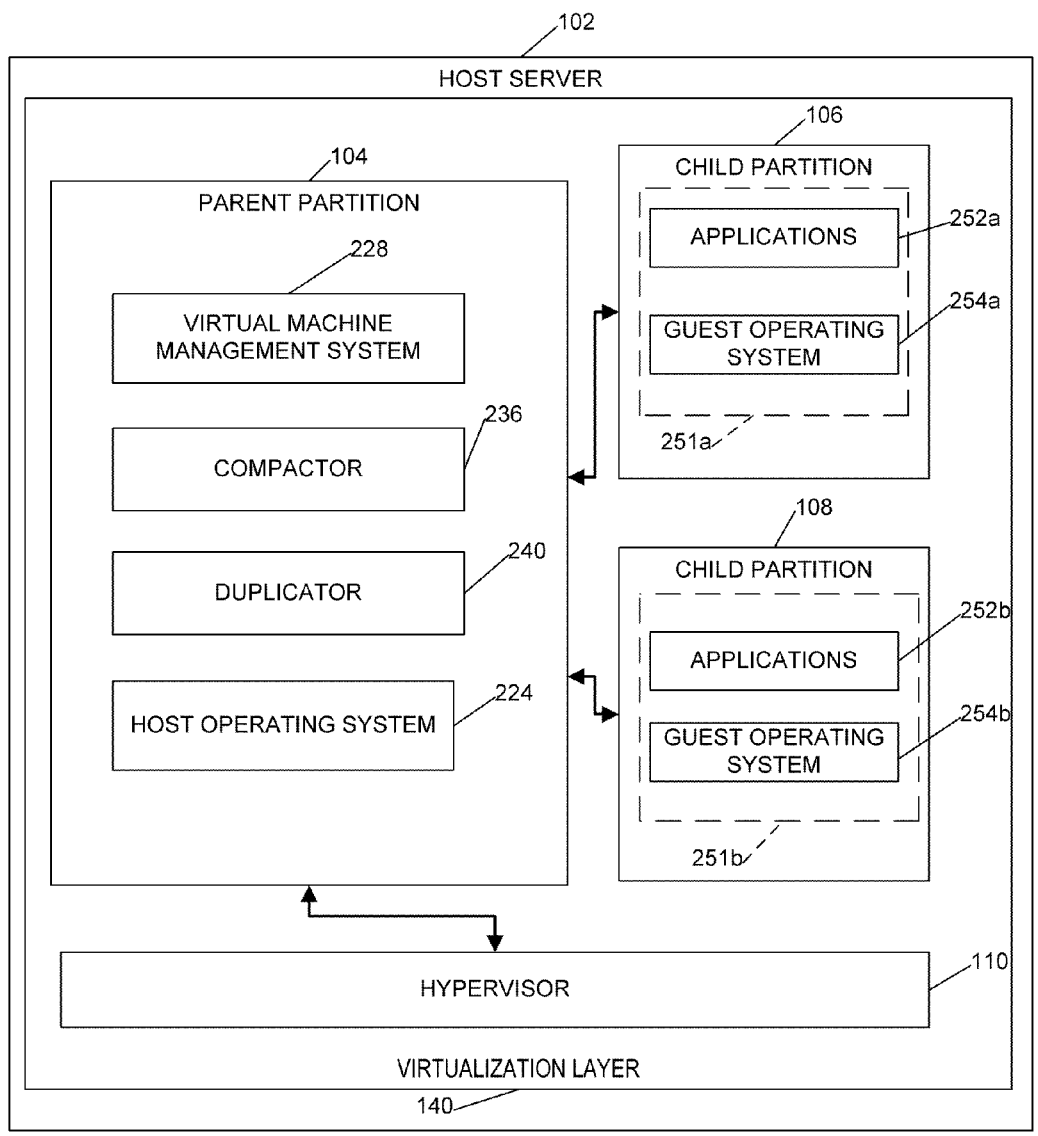
FIG. 2 illustrates an embodiment of a host server capable of compacting virtual machine files.

FIG. 2 illustrates an embodiment of a host server 102 capable of compacting virtual machine files (e.g., virtual machine file 251a or virtual machine file 251b) in accordance with the present disclosure. As described above in relation to FIG. 1, the host server 102 may include a virtualization layer 140, which can include a hypervisor 110 that allows for multiple isolated operating systems to run on the host server 102 at the same time. In the illustrated implementation, the hypervisor 110 is a native or "bare-metal" hypervisor that runs directly on top of the hardware platform of the host server 102. The hypervisor 110 supports multiple partitions 104, 106, and 108 on the host server 102. Partitions are logical units of isolation in which operating systems can execute. The partition 104 is the parent (or root) partition that runs a host operating system 224 (e.g., Microsoft Windows Server). The parent partition 104 can create one or more child partitions 106 and 108 which operate virtual machines 251a and 251b having guest operating systems 254a and 254b and applications 252a and 252b, respectively. In some virtualization implementations, there is one parent partition 104 and there can be zero, one, two, or more child partitions.

A virtual machine management system 228 can run in the parent partition 104 and may provide direct access to hardware devices (e.g., data store 112, processors, memory, graphics cards, etc.). The virtual machine management system 228 also can be responsible for managing the state of the virtual machines 251a and 251b running in the child partitions 106 and 108, respectively. In the illustrated embodiment, the child partitions 106 and 108 do not have direct access to hardware resources. The child partitions 106 and 108 may make requests (e.g., input/output (I/O) requests) to virtual devices, which can be redirected using inter-partition communication (e.g., a virtual bus) to the parent partition 104 (e.g., the virtual machine management system 228 in some embodiments), which directs the request (e.g., via the hypervisor 110) to an appropriate hardware device (e.g., a data store 112). In certain embodiments, the parent partition 104 may be a privileged virtual machine with direct access to the underlying I/O hardware.

In the example host server 102 illustrated in FIG. 2, the parent partition 104 includes a compactor 236 and a duplicator 240. As described above with reference to FIG. 1, a compactor and/or a duplicator can be included as part of a management server 120 and/or as part of a host server 102. In certain embodiments, the parent partition 104 may include a user interface (not shown) that includes some or all of the functionality of the user interface 126. Similarly, in certain embodiments, the compactor 236 and the duplicator 240 may include some or all of the embodiments described above with respect to the compactor 122 and the duplicator 124, respectively.

The compactor 236 may be configured to compact a virtual machine file associated with a virtual machine running in a child partition. For example, the compactor 236 may compact the virtual machine file associated with the virtual machine 251a running on the child partition 106. In some implementations, the compactor 236 may compact dynamic virtual machine files based on the size of the virtual machine file reaching or exceeding a threshold associated with the number or percentage of blocks that are not in use by the virtual machine or that include free blocks or data marked for deletion.

The duplicator 240 may be configured to duplicate a virtual machine file associated with a virtual machine running in a child partition. For example, the duplicator 240 may duplicate the virtual machine file associated with the virtual machine 251a running on the child partition 106.

In the example shown in FIG. 2, the virtual machines 251a and 251b in the child partitions 106 and 108 may be attached, mounted, or associated with one or more virtual disk files or virtual machine files 116 in the data store 112. In some implementations, the virtual machine file may include one or more virtual hard disks (VHDs). A virtual machine file, such as a VHD file, can include disk partitions and a file system, which can contain volumes, directories, folders, files, metadata, etc. In some implementations, a VHD attached to a virtual machine running in a child partition is simply a file to the parent partition. Thus, in some such implementations, what appears to be an entire file system volume when seen from within a running child virtual machine (e.g., running in the child partitions 106 or 108) is actually a large file when seem from the parent virtual machine (e.g., from the parent partition 104).

Example of a Virtual Machine File

Figure 3:
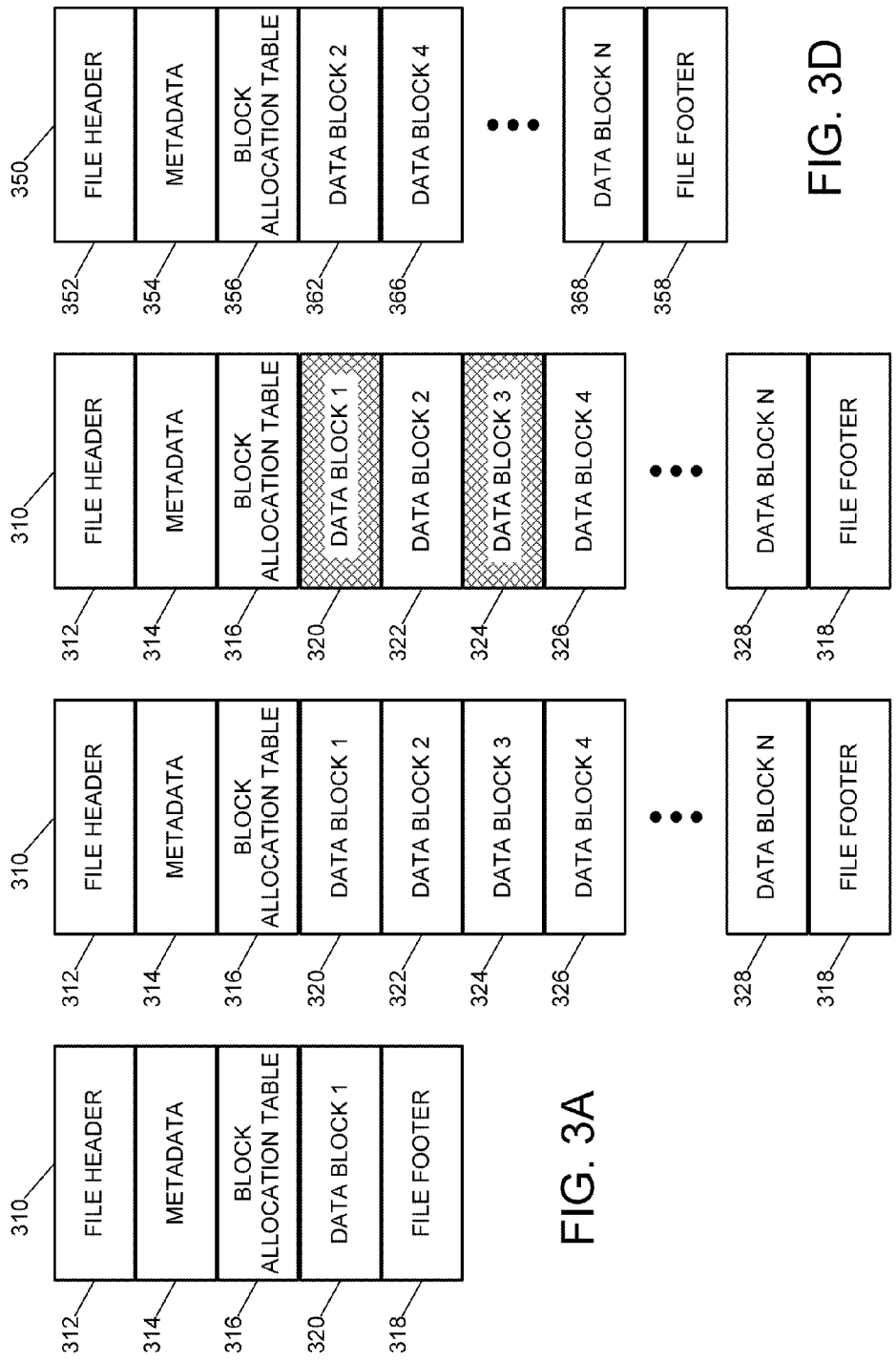
FIGS. 3A-3C illustrate an example of a virtual machine file.
FIG. 3D illustrates an example of a compacted virtual machine file.

FIGS. 3A-3C illustrate an example of a virtual machine file 310 in accordance with the present disclosure. The virtual machine file 310 can be associated with any type of virtual machine. Further, the virtual machine file 310 may be a dynamic, or dynamically expanding, virtual machine file. The example presented in FIGS. 3A-3C is intended to be illustrative of certain aspects of a compacting process and is not intended to be limiting.

FIG. 3A illustrates the example virtual machine file 310 when it is first created or initialized. The virtual machine file 310 includes a file header 312, metadata 314, a block allocation table (BAT) 316, a file footer 318, and one data block 320. In certain embodiments, the virtual machine file 310 may start with more or less data blocks when it is first created or initialized. Generally, the data block 320 includes the raw data that the virtual machine has written to the virtual hard disk associated with the virtual machine file 310.

The file header 312, virtual hard drive header, or dynamic virtual hard drive header, may include location information for the BAT 316 as well as additional parameters associated with the BAT 316 structure. In some embodiments, if the virtual machine file 310 is part of a differencing backup, the file header 312 may include pointers to data locations in the parent virtual hard disk.

Metadata 314 may include any information associated with the virtual machine file 310 that facilitates the maintenance, operation, and identification of the virtual machine file 310. For example, in some embodiments the metadata 314 may include information identifying the file systems, the guest operating system, and/or the applications of the virtual machine file 310. In some embodiments, the metadata 314 may include a Logical Cluster Number (LCN) bitmap that may be used to identify clusters of the virtual machine file 310 that are free or in use. The clusters may be equivalent to a data block of the virtual machine file 310. Alternatively, each cluster may be a fraction or multiple of a data block. For example, each data block may comprise four clusters. Typically, free blocks and/or free clusters include blocks and/or clusters without data or with data marked for deletion. However, in some embodiments, free blocks and/or clusters may refer to blocks and/or clusters without data. Each block and/or cluster may be sized based on the parameters of the virtual machine when the virtual machine file 310 is created.

The BAT 316 may be used to map virtual disk offsets to memory locations on the physical hard disk of the host server 102 or the data store 112. When the virtual machine file 310 is first created or initialized, the BAT 316 may include no entries if the virtual machine is created or initialized with no data blocks. In some embodiments, the virtual machine file 310 may not include a BAT 316. For example, some virtual machine files may use one or more pointers to map the entire virtual machine file to a set of contiguous memory locations on the physical hard disk instead of, or in addition to, using a BAT 316.

The file footer 318 may include any information associated with the virtual machine file 310. For example, the file footer 318 may include the size of the virtual hard disk, the virtual hard disk geometry, an identity of the virtual hard disk creator, etc. In some embodiments, the file footer 318 includes the metadata 314. Although FIG. 3A depicts a single file footer 318 following the data block 320, in some implementations, an additional copy, or mirror, of the file footer 318 may exist at the beginning of the virtual machine file 310 before the file header 312.

FIG. 3B illustrates the virtual machine file 310 after it has increased in size due to allocations of additional data blocks 322, 324, 326, 328, and any number of additional data blocks between data blocks 326 and 328 as indicated by the ellipse in FIG. 3B. With each additional data block that is added to the virtual machine file 310, the BAT 316 is modified to map the virtual disk offset associated with the additional data block to the location on the physical hard disk that includes the virtual machine file 310.

FIG. 3C illustrates the virtual machine file 310 after data blocks 320 and 324 have been deleted or marked for deletion, as indicated by the cross-hatch pattern of the blocks 320 and 324 in FIG. 3C. With each data block that is deleted or marked for deletion from the virtual machine file 310, the BAT 316 may be modified to remove the mapping between the virtual disk offsets of the deleted blocks and the locations on the physical hard disk that stores the actual data blocks.

After a number or percentage of data blocks have been deleted, or marked for deletion, the management server 120, compactor 122, compactor 236, or virtual machine management system 228 may initiate a compaction process. This compaction process is described in further detail below with respect to FIG. 4. In some embodiments, the compaction process is initiated based on whether a threshold related to the amount or percentage of free space or unused blocks in the virtual machine file is satisfied. This threshold may be based on the size of the virtual machine file, the amount or percentage of allocated blocks used, the amount or percentage of free blocks, the amount or percentage of allocated blocks marked for deletion, or a combination thereof. In some implementations, the number, percentage, size, threshold or any other appropriate value may be fixed or assigned by a system administrator. In other implementations, the number, percentage, size, threshold or any other appropriate value may dynamically adjusted (e.g., by the management server 120) based on usage statistics for the data store 112.

FIG. 3D illustrates an example of a compacted virtual machine file 350 in accordance with the present disclosure. The compacted virtual machine file 350 can also be considered the destination virtual machine file and the virtual machine file 310 can be considered the source virtual machine file. The compacted virtual machine file 350 represents a copy of the virtual machine file 310 after the compaction process. The compacted virtual machine file may include a file header 352, metadata 354, a BAT 356, a file footer 358, and a number of data blocks 362, 366, 368, and any number of data blocks between 366 and 368 as indicated by the ellipse in FIG. 3D.

In some embodiments, the file header 352, the metadata 354, and the file footer 358 may be copies or modified copies of the file header 312, the metadata 314, and the file footer 358, respectively. Alternatively, the file header 352, the metadata 354, and the file footer 358 may be created as part of the initialization process when the virtual machine file 350 is created.

The data blocks that were not deleted, or not marked for deletion, from the virtual machine file 310 may be copied or duplicated during the compaction process to the compacted virtual machine file 350. For example, the data blocks 362, 366, and 368 may correspond to copies of the data blocks 322, 326, and 328, respectively, from the virtual machine file 310. The data blocks deleted, or marked for deletion, from the virtual machine file 310 are not copied or duplicated to the virtual machine file 350 during the compaction process, which advantageously may increase the speed and efficiency of the compaction process. For example, the data blocks 320 and 324 are not copied to the virtual machine file 350 during the compaction process.

The BAT 356 can be initialized to indicate that there are zero entries in the compacted virtual machine file 350 when the compacted virtual machine file 350 is created. As blocks which are in use, or not free, from the virtual machine file 310 are copied to the compacted virtual machine file 350, the BAT 356 may be modified to map the virtual offsets of the added data blocks to the locations of the data blocks on the physical hard disk.

Once the virtual machine file 310 is compacted to the compacted virtual machine file 350, the virtual machine file 310 can, but need not, be deleted. As the compacted virtual machine file 350 does not include the data blocks that are not in use by the virtual machine associated with the virtual machine file 310, hard disk space is saved.

In other implementations, the compacting or duplicating process may (additionally or alternatively) access other data structures stored within the virtual machine file that contain information about the file system associated with the virtual machine file. For example, some virtual machine files may include a Master File Table (MFT), catalog file, inodes, or vnodes, or other metadata providing file system information. Such metadata may be stored as the metadata 314 in the example file 310.

Although FIGS. 3A-3D depict the process of expanding and then compacting a dynamically expanding virtual hard disk, it is possible to implement a similar process with a static or fixed size virtual hard disk. In such embodiments, if it is determined that the percentage of space used by a virtual machine with a static virtual hard disk remains below a threshold for a period of time, the static virtual hard disk can be compacted to a smaller static virtual hard disk. Further, in some embodiments, the compaction process, embodiments of which are described further with respect to FIG. 4, can be used to convert a dynamically expanding virtual hard disk to a fixed sized virtual hard disk and vice versa.

Example Compaction Process

Figure 4:
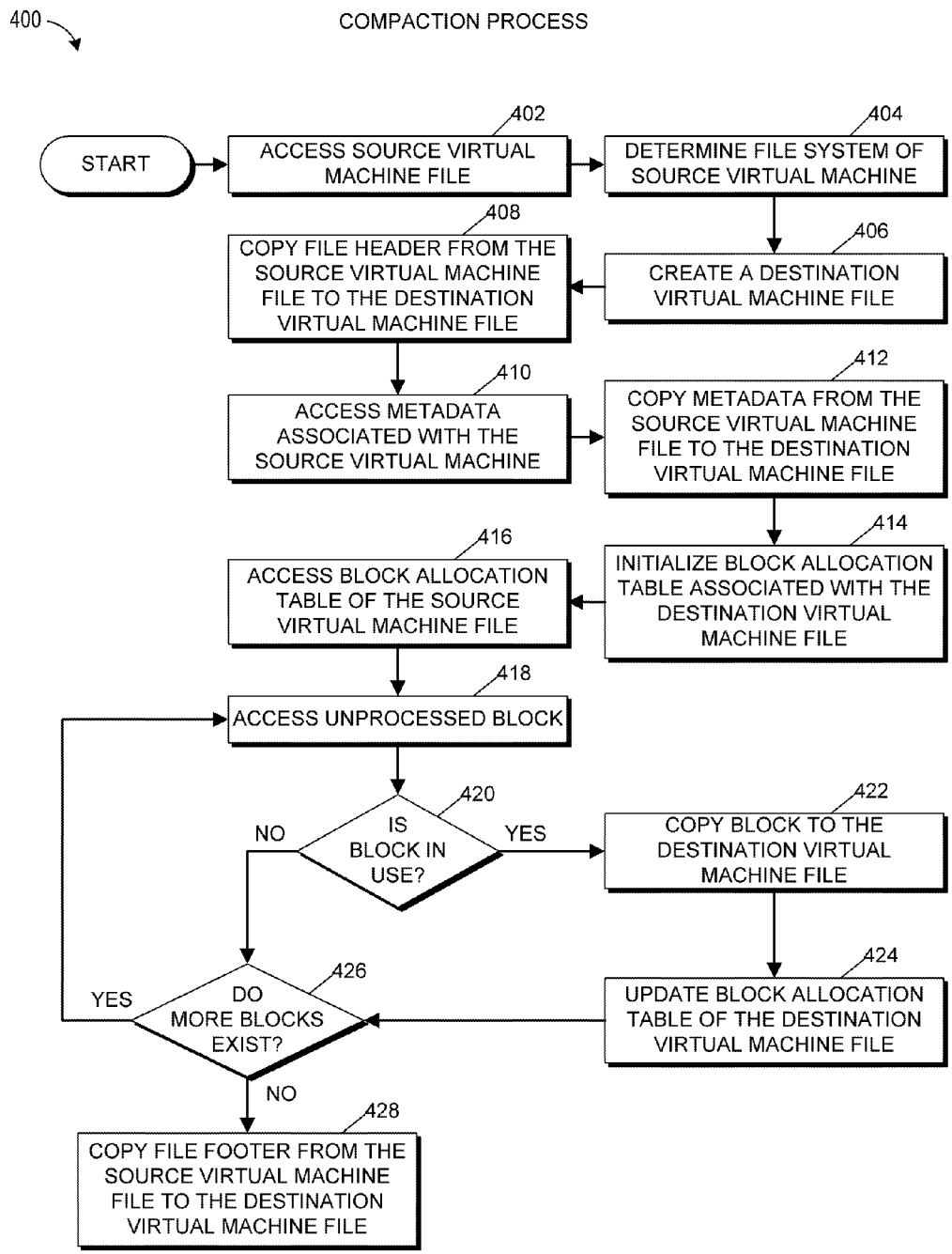
FIG. 4 presents a flowchart for an embodiment of a compaction process.

FIG. 4 presents a flowchart for an embodiment of a compaction process 400 in accordance with the present disclosure. In some embodiments, some or all of the process 400 can be performed as part of a backup process to reduce the size of backups of virtual machine files. Alternatively, or in addition, some or all of the process 400 can be performed as part of a transmission process to reduce the size of a virtual machine file that may be transmitted over a network (e.g., the network 130). Further, some or all of the process 400 may be performed to reduce a size of a virtual hard disk file. The process 400 can be implemented by any system capable of compacting a virtual machine file. For example, the process 400 may be implemented, at least in part, by the management server 120, the compactor 122, the duplicator 124, the virtual machine management system 228, the compactor 236, and the duplicator 240. To simplify discussion, and not to limit the disclosure, the process 400 will be described as being performed by the compactor 236.

The process 400 begins at block 402 when, for example, the compactor 236 accesses a source virtual machine file (e.g., the virtual machine file 251a or the virtual machine file 310). In some cases, the source virtual machine associated with the source virtual machine file can be deactivated (e.g., powered down, turned off, or have its execution ceased) prior to the process 400 accessing the virtual machine file. Accordingly, in some such cases, the source virtual machine need not be executing while the compactor 236 performs the process 400. Thus, in certain such cases, the compactor 236 need not monitor a running virtual machine to watch for file deletions. The compactor 236 determines the file system of the source virtual machine at block 404. Blocks 402 and 404 can include mounting and accessing as a volume the source virtual machine file by using the host operating system 224 Application Programmer Interfaces (APIs). For example, if the host operating system 224 is Windows 7, the APIs may include the OpenVirtualDisk and AttachVirtualDisk APIs. In some implementations, once the compactor 236 has obtained a handle to the source virtual machine file, the compactor 236 can determine the file system using, for example, the FSCTL_FILESYSTEM_GET_STATISTICS or the FSCTLE_QUERY_FILE_SYSTEM_RECOGNITION APIs. Alternatively, the compactor 236 may determine the file system of the source virtual machine by using a built-in API library associated with the file system of the source virtual machine.

At block 406, the compactor 236 creates a destination virtual machine file (e.g., the virtual machine file 251b or the virtual machine file 350) based on the file system identified at block 404. Then, the compactor 236 copies a file header from the source virtual machine file to the destination virtual machine file at block 408. Copying the file header may further include modifying the file header based on metadata specific to the destination virtual machine file, such as the location of the BAT.

At block 410, the compactor 236 accesses metadata associated with the source virtual machine. In certain embodiments, the metadata can include a LCN bitmap that tracks clusters to determine whether the clusters are free or in use. The source file system may be divided into an administrative unit called a logical cluster. Each logical cluster may be a fixed size based on the file system or determined when the source virtual machine file is formatted. Each cluster may be equivalent in size to a data block in the source virtual machine file or alternatively, may be some multiple or fraction of the data block size. In some embodiments, the metadata accessed may be based on the file system type identified at the block 404. The compactor 236 may access the LCN bitmap as a whole, or in portions. In some embodiments, the compactor 236 may use the FSCTL_GET_NTFS_VOLUME_DATA API to determine the volume cluster size and the number of logical clusters used within the guest operating system (e.g., the guest operating system 254a) of the source virtual machine file.

At block 412, the compactor 236 copies some or all of the metadata identified at the block 410 from the source virtual machine file to the destination virtual machine file. At block 414, the compactor 236 initializes the BAT of the destination virtual machine file. Initializing the BAT of the destination virtual machine file may include configuring the BAT to indicate that no data blocks are associated with the destination virtual machine file. Alternatively, initializing the BAT may include configuring the BAT to reflect a default number of data blocks. As another alternative, initializing the BAT of the destination virtual machine file may include configuring the BAT to reflect the number of data blocks the compactor 236 has determined are to be copied from the source virtual machine file to the destination virtual machine file.

At block 416, the compactor 236 accesses the BAT of the source virtual machine file. The compactor 236 accesses an unprocessed block from the source virtual machine file at block 418. An unprocessed block can generally include any data block associated with the source virtual machine that the compactor 236 has not accessed to determine whether the data block is free, marked for deletion, deleted, or in use.

Using one or more of the BAT, the LCN bitmap, and metadata associated with the source virtual machine file, the compactor 236 determines at decision block 420 whether the block is in use. Determining whether the block is in use may include determining whether the block includes data that is not marked for deletion. A non-limiting example process for determining whether a block is in use is described below with respect to FIG. 5. If the compactor 236 determines that the block is in use, the compactor 236 copies the block to the destination virtual machine file at block 422. The compactor 236 may then update the BAT of the destination virtual machine file at block 424. Updating the BAT may include mapping the data blocks that are copied to the destination virtual machine to a location on the physical hard drive where the data associated with the data blocks is stored.

After block 424, or if the compactor 236 determines at decision block 420 that the block is not in use, the compactor determines at decision block 426 whether additional blocks exist in the source virtual machine file. If the compactor 236 determines additional unprocessed blocks exist, the compactor 236 proceeds to perform the process associated with the block 418 and accesses another unprocessed block. If the compactor 236 determines that no more unprocessed blocks exist at decision block 426, the compactor copies the file footer from the source virtual machine file to the destination virtual machine file at block 428. In some embodiments, the compactor 236 may also copy a mirror of the file footer from the beginning of the source virtual machine file to the beginning of the destination virtual machine file. After block 428 is performed, the source virtual machine file may be deleted. The storage space reclaimed by deletion of the source virtual machine file may be used by the destination virtual machine file, or by a virtual machine associated with the destination virtual machine file. Further, in some cases, the reclaimed storage space may be used by other virtual machines or virtual machine files. In addition, in some cases the host server 102 may use the reclaimed space for any purpose regardless of whether it is for a virtual machine or some other purpose.

In some embodiments, the compactor 236 may use the duplicator 240 to perform the copying of the data blocks, file header, file footer(s), or metadata. In some embodiments, the duplicator 240 can be used to copy the source virtual machine file to a destination virtual machine file without performing a compaction process. In such embodiments, the duplicator 240 may copy the blocks that are in use from the source virtual machine file to the destination virtual machine file. The duplicator 240 can update one or more of a block allocation table, a LCN bitmap, and one or more pointers associated with the destination virtual machine file to duplicate the free space or blocks of the source virtual machine file that are not in use without physically copying the free blocks or blocks not in use. Advantageously, in certain embodiments, the ability to modify the BAT, LCN bitmap, and pointers of the destination virtual machine file without copying free blocks enables more efficient and faster copying of the source virtual machine file compared to a process that copies every block of the source virtual machine file regardless of whether the block is in use.

In some embodiments, the compactor 236 may update the metadata associated with the destination virtual machine file based on the blocks copied to the destination virtual machine file.

In some embodiments, the process 400 may be performed in response to a request from a user, such as an administrator. This request may be specified using, for example, the user interface 126.

Alternatively, or in addition, in some embodiments, some or all of the process 400 may be triggered in response to a determination that the number or percentage of free blocks, or blocks not in use, is above or equal to a threshold. For some cases, the process 400 may be triggered if the size of the virtual machine file exceeds a threshold. In other cases, the process 400 is triggered if both the size of the virtual machine file and a percentage of free blocks is above a threshold. In some embodiments, blocks marked for deletion may be included in the determination of free blocks. In some implementations, the threshold for determining whether to perform the process 400 may be set by a user or system administrators. In some implementations, the threshold for determining whether to perform the process 400 may be dynamically adjusted, e.g., based on usage statistics for the system. Alternatively, or in addition, the threshold may be based on the type of virtual machine file, the size of the virtual machine file, how often the virtual machine file is accessed, or any other parameter that can be used for setting a threshold for determining whether to perform the process 400. In some cases, the threshold may differ based on whether the virtual machine file is a dynamic or dynamically expanding virtual machine file, or a static or fixed size virtual machine file.

For example, if the source virtual machine file is a static virtual machine file that utilizes on average 25% of the originally allocated space and for a period of time (e.g., one year) has never exceeded 30% of the originally allocated space, the compactor 236 may use process 400 to compact the source virtual machine file to a static virtual machine file that is half the size of the source virtual machine file. Alternatively, in the preceding example, the compactor 236 may compact the source virtual machine file to a dynamic virtual machine file thereby ensuring the space is available if the use profile for the source virtual machine file changes during a later time period.

In some alternative embodiments, or in addition to the embodiments described above, the compactor 236 may use a source pointer associated with the source virtual machine file and a destination pointer associated with the destination virtual machine file to perform the process 400. For example, during an initial performance of the process of block 418, the compactor 236 may point a source pointer to a first unprocessed block in the set of blocks of the source virtual machine file. If the compactor 236 determines that the first unprocessed block is in use at decision block 420, the compactor 236 copies the block to the destination virtual machine file and advances a source and a destination file pointer by the size of the copied block. If the compactor 236 determines that the first unprocessed block is not in use at decision block 420, the block is not copied and the destination file pointer is not advanced. However, the source pointer is advanced by the size of the block. The process may then be repeated if it is determined at decision block 426 that more blocks exist in the source virtual machine file. Thus, a compacted version of the source virtual machine file may be created by copying blocks that are in use, but not copying blocks that are not in use. In some embodiments, blocks that are not in use are not copied, but both the source and destination file pointers are advanced. Advantageously, in certain embodiments, by advancing both the source and destination pointers, but not copying blocks that are not in use, a copying process can be performed that is faster and causes reduced wear on a physical storage device compared to a copy process that copies both the used and free blocks.

Although process 400 has been described in a specific order, process 400 is not limited as such and one or more of the operations of the process 400 may be performed in a different sequence. For example, in some embodiments, the block 424 may be performed after the compactor 236 determines that no more blocks exist at decision block 426.

Example of a Process for Determining if a Block is in Use

Figure 5:
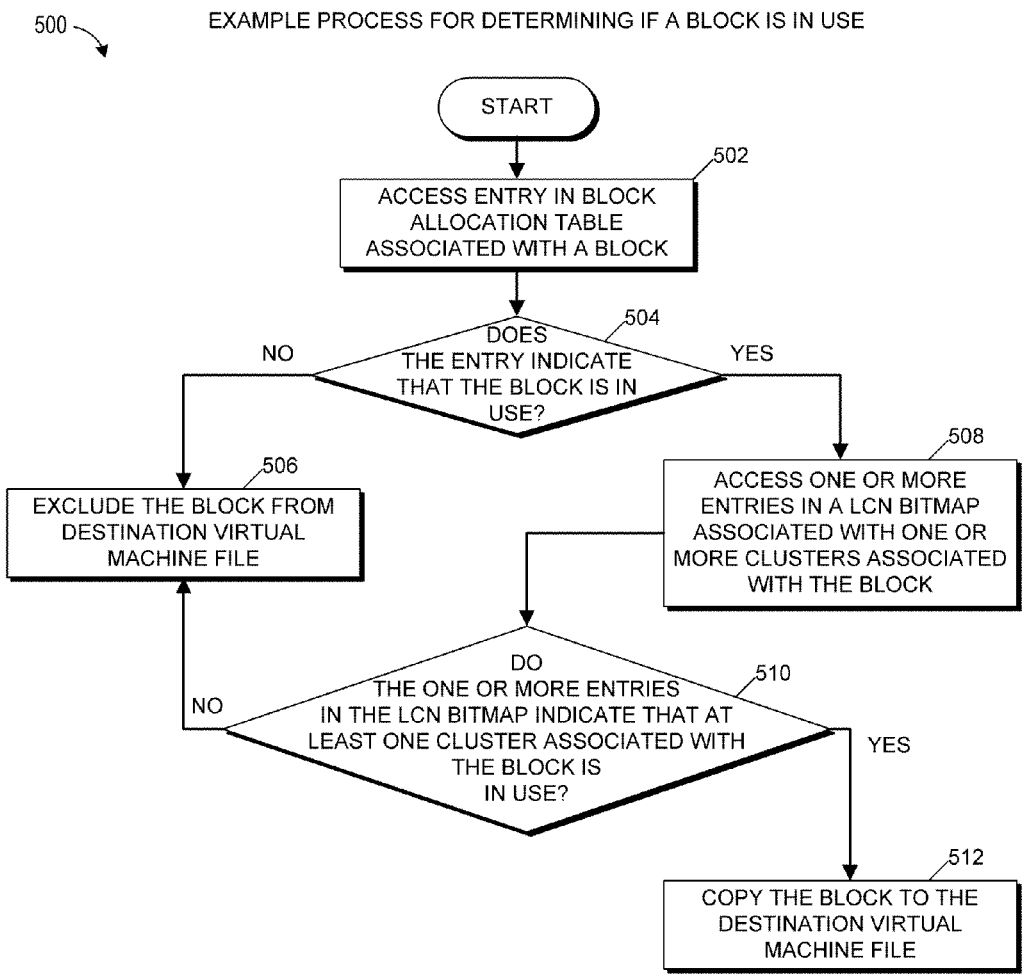
FIG. 5 presents a flowchart for an example of a process for determining if a block is in use.

FIG. 5 presents a flowchart for an example of a process 500 for determining if a block is in use. In some embodiments, some or all of the process 500 can be performed as part of a backup process to reduce the size of backups of virtual machine files. Alternatively, or in addition, some or all of the process 500 can be performed as part of a transmission process to reduce the size of a virtual machine file that may be transmitted over a network (e.g., the network 130). Further, some or all of the process 500 may be performed as part of the operation associated with the block 420 of the example process 400 described with reference to FIG. 4. The process 500 can be implemented by any system capable of compacting (or copying) a virtual machine file. For example, the process 500 may be implemented, at least in part, by the management server 120, the compactor 122, the duplicator 124, the virtual machine management system 228, the compactor 236, and the duplicator 240. To simplify discussion, and not to limit the disclosure, the process 500 will be described as being performed by the compactor 236.

The process 500 begins at block 502 when, for example, the compactor 236, which may be included as part of a host file system, accesses an entry in a BAT associated with a block. In some cases, the block 502 may occur as part of the block 418 and/or 420 of the process 400. The BAT may be part of a virtual machine file (e.g., the source virtual machine file) with a guest operating system. However, it is often the case that the guest operating system is unaware of the BAT.

At decision block 504, the compactor 236 determines whether the entry indicates that the block is in use. If not, the compactor 236 excludes the block from a destination virtual machine file at block 506. As discussed above, in some cases, the destination or target virtual machine file includes a copy, which may be a compacted copy, of a source virtual machine file.

If the compactor 236 determines at the decision block 504 that the entry indicates that the block is in use, the compactor 236 accesses one or more entries in a LCN bitmap associated with one or more clusters associated with the block at block 508. The LCN bitmap may be included as part of the virtual machine file. In contrast to the BAT, the guest file system and/or guest operating system is generally aware of the LCN bitmap. In some cases, each block is associated with one cluster, and thus, there may be a one to one correspondence between blocks in the BAT and clusters in the LCN bitmap. However, in some cases, multiple clusters may be associated with a block. For example, each block may be associated with four clusters. Generally, a cluster is associated with a single block. However, in certain cases, a cluster may be associated with multiple blocks.

At decision block 510, the compactor 236 determines whether one or more entries in the LCN bitmap indicate that at least one cluster associated with the block is in use. As previously indicated, a cluster, or block, that is in use can include any cluster, or block, that is not marked for deletion or that includes data. If the compactor 236 determines that no clusters associated with the block are in use, then the compactor 236 excludes the block from a destination virtual machine file at block 506.

If the compactor 236 determines that at least one cluster associated with the block is in use, then the compactor 236 copies the block to the destination virtual machine file at block 512. In some embodiments, the block 512 can include one or more of the embodiments described above with respect to the blocks 422. Further, the block 512 can include updating the BAT of the destination virtual machine file to map data blocks of the destination virtual machine file to locations on the physical storage device that stores the data blocks. Further, in some cases, updating the BAT can include mapping entries in the BAT to clusters in the LCN bitmap of the destination virtual machine file.

Examples of Possible Advantages of Certain Embodiments of Systems and Methods for Compacting a Virtual Machine File As described herein, there may be a number of advantages to using the systems and processes described herein for compacting and/or copying a virtual machine file. In some cases, a virtual machine file can be compacted without an associated virtual machine running or being powered on. Thus, it is possible for the virtual machine file to be compacted before a virtual machine is powered on, executed, or initiated using the virtual machine file. Further, it is possible for the virtual machine file to be compacted after a virtual machine using the virtual machine file is shut down or powered off. In certain situations, the virtual machine file may be compacted while the virtual machine using the virtual machine file is powered on, active, or running.

It is generally possible for the compactor 236 to compact any type of virtual machine file without modifying the virtual machine file or the operation of a virtual machine using the virtual machine file. Thus, it is possible for the compactor 236 to be used to compact existing configurations of virtual machine files designed to be used with existing types of virtual machines.

Further, the compactor 236 can compact a virtual machine file without monitoring the activity of the virtual machine associated with the virtual machine file. Thus, in some cases, the compactor 236 can compact the virtual machine file without monitoring the occurrence of deletions, writes, or other operations performed by the virtual machine. Advantageously, because the compactor 236 can compact the virtual machine file without monitoring the activity of the virtual machine, it is possible for the compaction to occur at any time and on any number of virtual machine files whether or not the compactor 236 has access to the virtual machine files at all times. For example, the compactor 236 need not be executing while the virtual machine is also executing. Thus, in some cases, compaction of virtual machine files may be performed as a batch process.

Moreover, the compactor 236 can compact the virtual machine file without the virtual machine, or any other system, being required to use special writes or deletions to indicate which blocks to copy or which blocks to exclude or not copy. For example, unlike some systems, the compactor 236 can identify blocks that have been deleted without the use of a special sequence (e.g., a zero-filled block) or a predefined pattern to mark deleted logical or physical blocks. Therefore, in some cases, the compactor 236 can determine whether a block is in use without comparing a block to a special data or bit sequence. Further, in some such cases, the compactor 236 need not link a logical block of a file to be deleted with a designated block that corresponds to a physical block (e.g., a block on a physical storage device).

Once storage space has been freed by use of the compactor 236 to compact a source virtual machine file, the freed storage space may be used by the destination virtual machine file, by another virtual machine file, or by the host server 102 regardless of whether the host server 102 uses the free storage space for a virtual machine file.

Terminology

For purposes of illustration, certain aspects, advantages and novel features of various embodiments of the inventions have been described herein. It is to be understood that not necessarily all such advantages may be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure.

Depending on the embodiment, certain acts, events, or functions of any of the algorithms, methods, or processes described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, processes, methods, and algorithms described in connection with the embodiments disclosed herein can be implemented as electronic hardware, computer software, or combinations of both. To clearly illustrate this interchangeability of hardware and software, various illustrative components, blocks, modules, operations, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The blocks, operations, or steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, an optical disc (e.g., CD-ROM or DVD), or any other form of volatile or non-volatile computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of sequential, or time-ordered language, such as "then", "next", "subsequently" and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method performed by a physical computer system for compacting a virtual machine file, the method comprising:
   under control of a physical computer system configured for use with virtual machines associated with virtual machine files:
   accessing a source virtual machine file associated with a guest file system;
   determining the guest file system associated with the source virtual machine file;
   creating a destination virtual machine file based on the guest file system;
   initializing a block allocation table of the destination virtual machine file;
   accessing a block allocation table of the source virtual machine file and for each block of the source virtual machine file identified in the block allocation table of the source virtual machine file:
      determining whether the block includes data that is not marked for deletion from the source virtual machine file;
      in response to determining that the block includes data that is not marked for deletion from the source virtual machine file, copying the block to the destination virtual machine file and updating the block allocation table of the destination virtual machine file; and
      in response to determining either that the block does not include data or that the block includes data which is marked for deletion from the source virtual machine file, not copying the block and not updating the block allocation table of the destination virtual machine file, thereby reducing a size of the destination virtual machine file compared to a size of the source virtual machine file.

2. The method of claim 1, further comprising copying a file header of the source virtual machine file to the destination virtual machine file.

3. The method of claim 1, further comprising copying a file footer of the source virtual machine file to the destination virtual machine file.

4. The method of claim 1, wherein determining whether the block is in use comprises:
   accessing a logical cluster number bitmap of the source virtual machine file;
   identifying one or more clusters associated with the block; and
   using the logical cluster number bitmap to determine whether at least one of the one or more clusters is in use.

5. The method of claim 1, further comprising copying metadata associated with the source virtual machine file to the destination virtual machine file.

6. The method of claim 5, further comprising updating the metadata associated with the destination virtual machine file based on the blocks copied from the source virtual machine file to the destination virtual machine file.

7. The method of claim 1, further comprising:
   determining the size of the source virtual machine file prior to creating the destination virtual machine file; and
   in response to determining that the size of the source virtual machine file satisfies a threshold, creating the destination virtual machine file.

8. The method of claim 7, wherein determining that the size of the source virtual machine file satisfies the threshold further comprises determining that the size of the source virtual machine file exceeds a threshold size.

9. The method of claim 1, further comprising:
   determining a percentage of blocks not in use prior to creating the destination virtual machine file; and
   in response to determining that the percentage of blocks not in use satisfies a threshold, creating the destination virtual machine file.

10. The method of claim 9, wherein determining that the percentage of blocks not in use satisfies the threshold further comprises determining that the percentage of blocks not in use exceeds a threshold percentage.

11. The method of claim 1, wherein an initial size of the destination virtual machine file is less than the size of the source virtual machine file.

12. The method of claim 1, wherein the source virtual machine file comprises a dynamic virtual machine file.

13. The method of claim 1, wherein the destination virtual machine file comprises a dynamic virtual machine file.

14. The method of claim 1, wherein determining whether the block is in use comprises determining whether the block is in use based, at least in part, on the block allocation table.

15. The method of claim 1, further comprising deactivating a source virtual machine associated with the source virtual machine file prior to accessing the source virtual machine file.

16. A system for compacting a virtual machine file, the system comprising a physical computing system configured to:
  access a source virtual machine file associated with a guest file system;
  create a destination virtual machine file based on the guest file system;
  initialize a block allocation table of the destination virtual machine file;
  access a block allocation table of the source virtual machine file and for each block of the source virtual machine file identified in the block allocation table of the source virtual machine file:
    determine whether the block includes data that is not marked for deletion from the source virtual machine file;
    in response to determining that the block includes data that is not marked for deletion from the source virtual machine file, copy the block to the destination virtual machine file and update the block allocation table of the destination virtual machine file; and
    in response to determining either that the block does not include data or that the block includes data which is marked for deletion from the source virtual machine file, refrain from copying the block and refrain from updating the block allocation table of the destination virtual machine file, thereby reducing a size of the destination virtual machine file compared to a size of the source virtual machine file.

17. The system of claim 16, wherein the physical computing system is further configured to determine the guest file system associated with the source virtual machine file.

18. The system of claim 16, wherein the physical computing system is further configured to copy a file header of the source virtual machine file to the destination virtual machine file.

19. The system of claim 16, wherein the physical computing system is further configured to copy a file footer of the source virtual machine file to the destination virtual machine file.

20. The system of claim 16, wherein determining whether the block is in use comprises:
  accessing a logical cluster number bitmap of the source virtual machine file;
  identifying one or more clusters associated with the block; and
  using the logical cluster number bitmap to determine whether at least one of the one or more clusters is in use.

21. The system of claim 16, wherein the physical computing system is further configured to copy metadata associated with the source virtual machine file to the destination virtual machine file.

22. The system of claim 21, wherein the physical computing system is further configured to update the metadata associated with the destination virtual machine file based on the blocks copied from the source virtual machine file to the destination virtual machine file.

23. The system of claim 16, wherein the physical computing system is further configured to:
  determine the size of the source virtual machine file prior to creating the destination virtual machine file; and
  in response to determining that the size of the source virtual machine file satisfies a threshold, create the destination virtual machine file.

24. The system of claim 16, wherein the physical computing system is further configured to:
  determine a percentage of blocks not in use prior to creating the destination virtual machine file; and
  in response to determining that the percentage of blocks not in use satisfies a threshold, create the destination virtual machine file.

25. A system for compacting a virtual machine file, the system comprising:
  a physical host server comprising a virtualization layer configured to support a parent partition and one or more child partitions, the parent partition comprising a virtual machine management system and a compactor, the one or more child partitions each comprising a virtual machine associated with a guest operating system and one or more applications;
  a data store comprising one or more virtual machine files configured to be accessed by the one or more child partitions; and
  the compactor configured to:
    access, from the data store, a source virtual machine file comprising a dynamic virtual machine file and a guest file system;
    create a destination virtual machine file based, at least in part, on the guest file system, the destination virtual machine file comprising a dynamic virtual machine file;
    initialize a block allocation table of the destination virtual machine file;
    access a block allocation table of the source virtual machine file and for each block of the source virtual machine file identified in the block allocation table of the source virtual machine file:
      determining whether the block includes data that is not marked for deletion from the source virtual machine file;
      in response to determining that the block includes data that is not marked for deletion from the source virtual machine file, causing the block to be copied to the destination virtual machine file and updating the block allocation table of the destination virtual machine file; and
      in response to determining either that the block does not include data or that the block includes data which is marked for deletion from the source virtual machine file, not causing the block to be copied and not updating the block allocation table of the destination virtual machine file thereby reducing a size of the destination virtual machine file compared to a size of the source virtual machine file.

26. The system of claim 25, wherein the compactor is further configured to determine the guest file system associated with the source virtual machine file.

27. The system of claim 25, further comprising a duplicator configured to copy a block to the destination virtual machine file in response to the compactor determining that the block is in use.

28. The system of claim 25, wherein each of the one or more applications access resources of the host server via a hypervisor.

29. The system of claim 25, wherein each of the one or more applications access resources of the host server via a virtual machine management system.

30. Non-transitory computer storage configured to store executable instructions that when executed by a processor cause the processor to:

access a source virtual machine file comprising a dynamic virtual machine file associated with a guest file system;

determine the guest file system associated with the source virtual machine file;

create a destination virtual machine file based on the guest file system, the destination virtual machine file comprising a dynamic virtual machine file;

initialize a block allocation table of the destination virtual machine file;

access a block allocation table of the source virtual machine file and for each block of the source virtual machine file identified in the block allocation table of the source virtual machine file:

determine whether the block includes data that is not marked for deletion from the source virtual machine file;

in response to determining that the block includes data that is not marked for deletion from the source virtual machine file, copy the block to the destination virtual machine file and update the block allocation table of the destination virtual machine file; and in response to determining either that the block does not include data or that the block includes data which is marked for deletion from the source virtual machine file, not copy the block and not update the block allocation table of the destination virtual machine file thereby reducing a size of the destination virtual machine file compared to a size of the source virtual machine file.

\* \* \* \* \*